US011944980B2

(12) United States Patent
Suderman

(10) Patent No.: US 11,944,980 B2
(45) Date of Patent: Apr. 2, 2024

(54) MAGNETIC SEPARATING CONVEYOR OUTPUT ROLL

(71) Applicant: Bunting Magnetics Co., Newton, KS (US)

(72) Inventor: Donald A. Suderman, Newton, KS (US)

(73) Assignee: Bunting Group, Inc., Newton, KS (US)

(*) Notice: Subject to any disclaimer, the term of this patent is extended or adjusted under 35 U.S.C. 154(b) by 35 days.

(21) Appl. No.: 16/857,742

(22) Filed: Apr. 24, 2020

(65) Prior Publication Data

US 2020/0246807 A1 Aug. 6, 2020

(51) Int. Cl.
*B03C 1/18* (2006.01)
*B03C 1/033* (2006.01)
*B03C 1/12* (2006.01)

(52) U.S. Cl.
CPC ............ *B03C 1/18* (2013.01); *B03C 2201/20* (2013.01)

(58) Field of Classification Search
CPC .......... B03C 1/18; B03C 2201/20; B03C 1/03
USPC .................................................. 209/219, 228
See application file for complete search history.

(56) References Cited

U.S. PATENT DOCUMENTS 994,871 A 6/1911 Payne
2,489,264 A 11/1949 Byrd, Jr.
2,959,288 A 11/1960 Fowler
3,389,794 A * 6/1968 Miyata ...................... B03C 1/12 209/219
3,454,913 A * 7/1969 Israelson ............... B03C 1/0332 335/306
3,457,618 A * 7/1969 Gunter ................... D01G 15/94 492/8
4,003,830 A 1/1977 Schloemann
4,869,811 A 9/1989 Wolanski et al.
4,882,043 A 11/1989 Jung
5,051,177 A 9/1991 Dauchez
(Continued)

FOREIGN PATENT DOCUMENTS

CN 109569880 4/2019
EP 0687504 12/1995
WO WO0025929 5/2000

*Primary Examiner* — Michael McCullough
*Assistant Examiner* — Molly K Devine
(74) *Attorney, Agent, or Firm* — Kenneth H. Jack; Davis & Jack L.L.C.

(57) ABSTRACT

A magnetic separating conveyor output roll including a first plurality of magnetic rings, each of such magnetic rings having radially inner and radially outer ends, each such magnetic ring having annular north and south poles respectively positioned at its radially inner and radially outer ends; and including a second plurality of magnetic rings having radially inner and radially outer ends, each such magnetic ring having annular north and south poles respectively positioned at its radially outer and radially inner ends; wherein the first and second pluralities of magnetic rings are stacked in an alternating series along a rotation axis; wherein each magnetic ring's radial cross section is rectangular; wherein each magnetic ring includes a circumferential array of radially extending seams, the roll incorporating a plurality of adhesive bonds residing within such seams; the roll further incorporating magnetic armature effect resisting gaps between adjacent pairs of the magnetic rings.

6 Claims, 6 Drawing Sheets

(56) References Cited

U.S. PATENT DOCUMENTS

| | | | | |
|---|---|---|---|---|
| 5,108,587 | A | 4/1992 | Walker | |
| 5,394,991 | A | 3/1995 | Kumagai et al. | |
| 5,860,532 | A | 1/1999 | Arvidson | |
| 5,938,579 | A | 8/1999 | Cavazos | |
| 6,041,942 | A | 3/2000 | Goolsby | |
| 6,540,088 | B2 * | 4/2003 | Oder | B03C 7/006<br>209/128 |
| 8,109,383 | B1 | 2/2012 | Suderman et al. | |
| 9,010,538 | B2 | 4/2015 | Smolkin et al. | |
| 9,375,727 | B2 | 6/2016 | Molteni | |
| 9,962,710 | B2 | 5/2018 | Suderman | |
| 10,030,701 | B2 | 7/2018 | Helgesen et al. | |

* cited by examiner

MAGNETIC SEPARATING CONVEYOR OUTPUT ROLL

FIELD OF THE INVENTION

This invention relates to the output end pulley or output end roll component of a continuous loop belt magnetic materials separating conveyor. More particularly, this invention relates to the character and arrangement of permanent magnets which are incorporated into such rolls.

BACKGROUND OF THE INVENTION

Conventional and commonly known magnetic separating conveyors include a continuous loop conveyor belt which rollably cycles about an upstream or input end pulley or roll, and which rollably cycles about a downstream output end pulley or roll. Permanent magnets are known to be mounted within and as a part of the output rolls of such separating conveyors in order to extract ferrous materials from a body of source materials which is conveyed along the upper flight of the conveyor's continuous loop belt.

Non-ferrous materials conveyed by such magnetic separating conveyors typically fall along a conveyor exiting trajectory which is directed downwardly and slightly forwardly from the output end of the conveyor. In contrast, ferrous materials which are attracted by the output rolls' magnets during such materials' arcuate path about the output roll fall along exit trajectories which are skewed rearwardly with respect to the downward and slightly forward exit trajectories of the non-ferrous materials.

Where a collection bin is positioned beneath the output end of such magnetic separating conveyor at a position which coincides with such rearwardly skewed exit trajectories, the magnetic separating conveyor may advantageously collect an extract of the source materials which substantially exclusively consists of ferrous materials. However, where the source materials carried by such conventional magnetic separating conveyors include a mixture of ferrous materials, electrically conductive non-ferrous materials, and non-conductive non-ferrous materials, such conveyors are often incapable of collecting such substantially exclusive ferrous materials extract.

Such deficit in conventional separators' ability to collect an exclusive ferrous materials extract may be attributed to the orientations of those separators' magnetic fields. During rotating operation, the output roll of a conventional magnetic separating conveyor commonly produces orbiting magnetic fields whose looped lines of magnetic flux lie within planes which cross or intersect the roll's rotation axis. As electrically conductive and non-ferrous materials begin to travel within their conveyor exiting trajectories, the orbiting magnetic fields cross such materials' paths. As the conventional roll's magnetic fields orbitally intersect the exit trajectories of the non-ferrous and electrically conductive materials, Lenz effect inductions of electric micro-currents occur within such materials. Just as such roll's orbiting magnetic flux loops lie within planes which intersect the roll's rotation axis, portions of the work exerted by the flux upon such materials via Lenz effects is directed rearwardly. Such Lenz effect generated forces tend to undesirably skew such materials' exit trajectories rearwardly.

Such Lenz effect skewing of the exit trajectories of electrically conductive non-ferrous materials are known to divert such materials into a collection bin which is intended to exclusively collect a ferrous metal extract of the source materials, undesirably tainting the purity of such extract.

The instant inventive magnetic separating conveyor output roll solves or ameliorates the problems, defects, and deficiencies of conventional magnetic separating conveyor rolls by specially configuring the magnets of the roll to substantially exclusively generate orbiting magnetic fields whose looping lines of magnetic flux lie within planes which include rather than intersect the roll's rotation axis.

BRIEF SUMMARY OF THE INVENTION

A first structural component of the instant inventive magnetic separating conveyor output roll comprises a first plurality of magnetic rings. In the preferred embodiment, each ring among the first plurality of magnetic rings has a rectangular or square radial cross sectional shape. Circular rotations of such rectangular cross sections about the rotation axis of the roll geometrically define outer and inner ends or surfaces which extend completely annularly or circumferentially. In the preferred embodiment, each ring among the first plurality of magnetic rings presents annularly extending north and south poles which are respectively positioned at said each ring's annular outer and inner ends.

A further structural component of the instant inventive magnetic separating conveyor output roll comprises a second plurality of magnetic rings which are configured similarly with the first plurality of magnetic rings, with the exception that the annular north and south poles of each second magnetic ring is respectively positioned at said each ring's inner and outer ends. The first and second pluralities of magnetic rings are stacked in a series along the axis of rotation of the roll, such series preferably arranging the first and second magnetic rings in an alternating fashion wherein each first magnetic ring is axially adjacent either a pair of the second magnetic rings or one of such rings, and wherein each second magnetic ring is axially adjacent either a pair of the first magnetic rings or one of such rings.

During rotating operation of the instant inventive magnetic separating conveyor output roll, each of the roll's orbiting lines of magnetic flux extends and loops between north and south poles within a plane which includes the roll's rotation axis. Similarly with the function of conventional magnetic separating conveyors, such orbiting magnetic flux loops intersect the exit trajectories of items of non-ferrous electrically conductive material which fall from the output end of the conveyor. However, unlike the conventional separating conveyors, the flux lines generated by instant inventive roll advantageously skew the exit trajectories of the non-ferrous electrically conductive materials only in the axial or lateral direction.

The instant inventive roll assures that Lenz effects which are experienced by the non-ferrous electrically conductive material during travel along their exit trajectories tend to skew those trajectories only laterally with respect to the longitudinally moving conveyor, or axially with respect to the roll's rotation axis.

The axial plane oriented magnetic flux which is generated by the instant inventive roll advantageously prevents rearward skewing of the exit trajectories of electrically non-conductive non-ferrous components of the source material. Accordingly, the instant inventive roll prevents such electrically conductive non-ferrous materials from becoming intermingled with a desirably pure stainless steel extract of the source materials.

Accordingly, objects of the instant invention include the provision of a magnetic separating conveyor output roll which incorporates structures as described above, and which arranges those structures in manners described above for the achievement and performance of beneficial functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
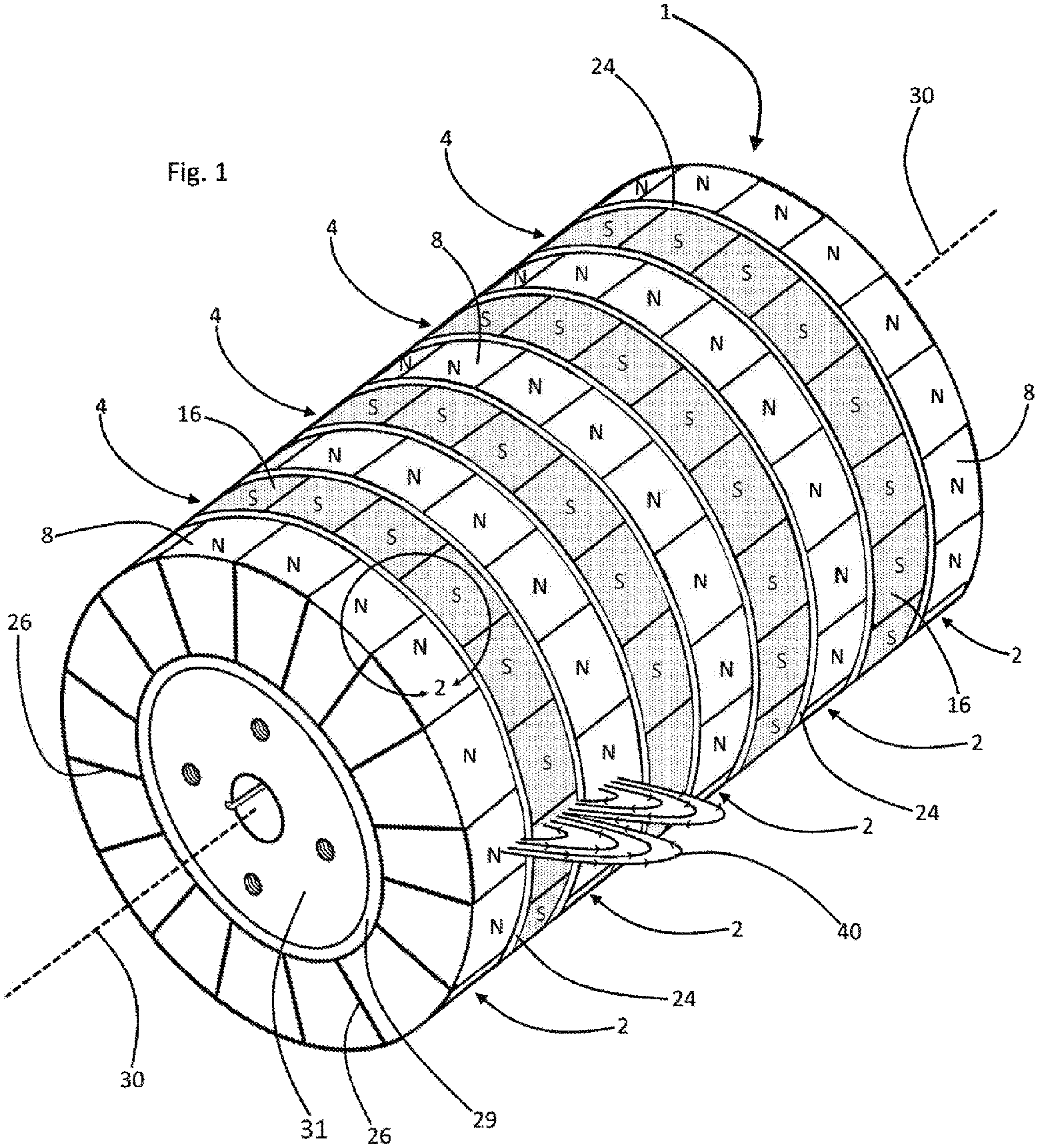
FIG. 1 is a perspective view of a preferred embodiment of the instant inventive magnetic separating conveyor output roll.
Figure 7:
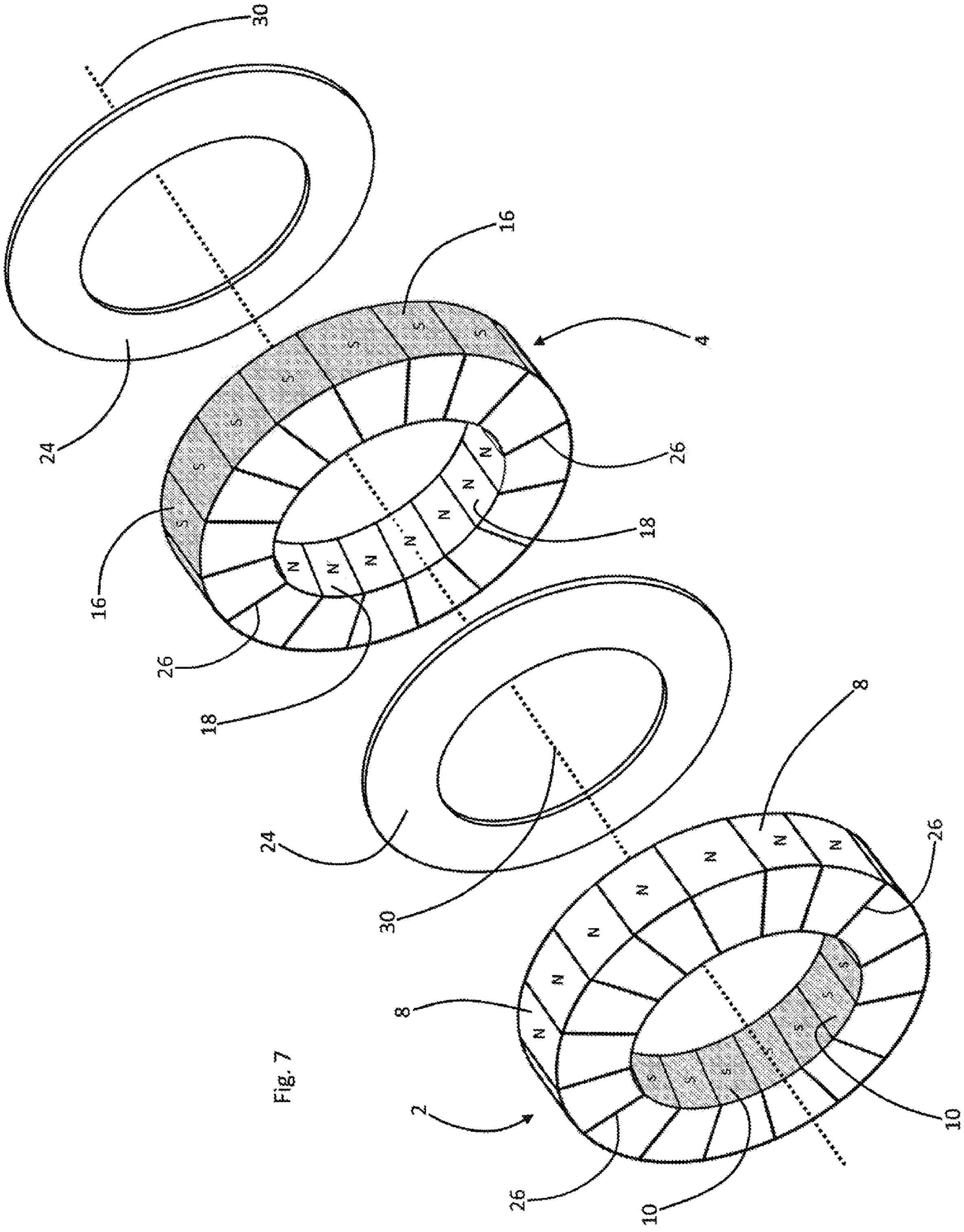
FIG. 7 shows in exploded view pairs of magnetic rings and non-magnetic spacer ring components of the FIG. 1 structure.
Figure 8:
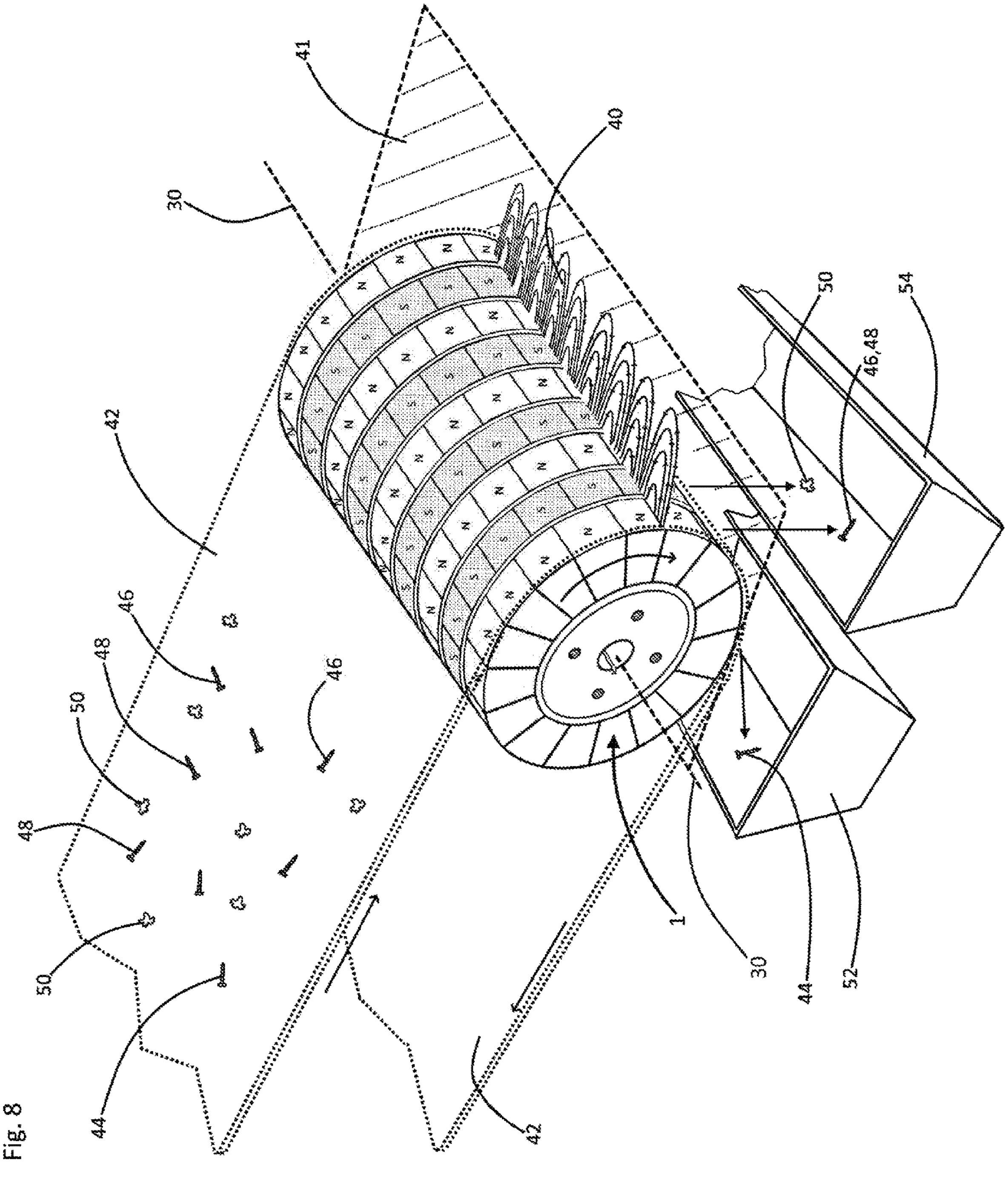
FIG. 8 redepicts the structure of FIG. 1, the view additionally showing continuous loop belt and collection bin components.

Referring now to the drawings, and in particular to Drawing FIGS. 1 and 7, a preferred embodiment of the instant inventive magnetic separating conveyor output roll is referred to generally by Reference Arrow 1. The roll 1 preferably comprises a first plurality of magnetic rings which are referred to generally by Reference Arrows 2. In the exemplary roll 1 of Drawing FIG. 1, the first plurality of magnetic rings 2 includes five of such rings. Each of the first magnetic rings 2 has a radially inner end 10 and has a radially outer end 8. The north pole "N" of each of the magnetic rings 2 is preferably annular or completely circumferential, such pole residing at the ring's radially outer end 8. Correspondingly, the south poles "S" of the magnetic rings 2 are similarly annular or completely circumferential, such south poles residing at the radially inner ends 10 of such rings.

A further structural component of the instant inventive magnetic separating conveyor output roll 1 comprises a second plurality of magnetic rings which are referred to generally by Reference Arrows 4. In the exemplary roll 1 of Drawing FIG. 1, four of such rings 4 are provided. Each second ring 4 is preferably configured substantially identically with the first rings 2, with the exception that the north poles of the second rings 4 reside at such rings' radially inner ends, their south poles residing at their radially outer ends.

As indicated in FIGS. 1 and 7, the first plurality of magnetic rings 2 and the second plurality of magnetic rings 4 are stacked in series along a rotation axis 30, such series preferably being arranged in an alternating sequence. Adoption of the instant invention's preferred alternating polarity magnetic ring arrangement assures that each magnetic ring is axially adjacent to either a pair of rings which are an opposite of its type or is adjacent to one of such rings.

In use of the instant inventive roll 1, referring to FIGS. 1 and 7, a continuous loop conveyor belt 42 extends over the forward 180° surface of the roll 1, such belt semi-circularly covering such roll from a vertically upward or twelve o'clock position to a vertically downward or six o'clock position. Source materials conveyed upon the upper surface of the upper flight of the belt 42 may, for example, include stainless steel screws 44, multiple items of non-ferrous and non-electrically conductive debris 50, aluminum screws 46, and brass screws 48. Provided that the magnetic rings 2 and 4 are composed of neodymium iron boron, samarium cobalt, aluminum nickel cobalt, iron oxide ceramic, or ferrite ceramic materials, the stainless steel screws may be effectively extracted from the source materials via the rings' magnetic strength and attraction. The exit trajectories of such screws 44 are advantageously directed rearwardly, falling into collection bin 52. The non-ferrous and non-electrically conductive component of the source materials 50 advantageously falls along exit trajectories directed downwardly from the forward aspect of the roll 1, causing such materials to collect within a forward bin 54. The exit trajectories of such materials 50 are not altered or skewed by the magnetic character of the roll 1 because such materials have a very low magnetic susceptibility. Such trajectories also are left unaltered via Lenz effects and electro-magnetic induction because such materials have a high electrical resistance.

The exclusive radial alignments of the polar axes of the roll 1 assure that each north to south looping line of magnetic flux 40 resides within a plane 41 which also includes the roll's 15 rotation axis 30. As a result of such axial plane orientations of the magnetic flux 40, Lenz effect generated force vectors applicable to electrically conductive items (e.g., screws 46,48) moving within and relative to such flux 40 point substantially exclusively within such axial planes 41. Accordingly, in 20 operation of the instant invention, Lenz effects imposed upon the non-ferrous electrically conductive screws 46,48 exclusively skew those screws' exit trajectories in the axial direction or leftwardly and rightwardly, with little or no skewing in the rearward direction. Screws 46,48 advantageously fall into collection bin 54 instead of into bin 52. Accordingly, the magnetic rolls' creation and facilitation of such axial plane oriented magnetic flux lines 40 prevents fouling of the stainless steel extract collected within bin 52.

Figure 2:
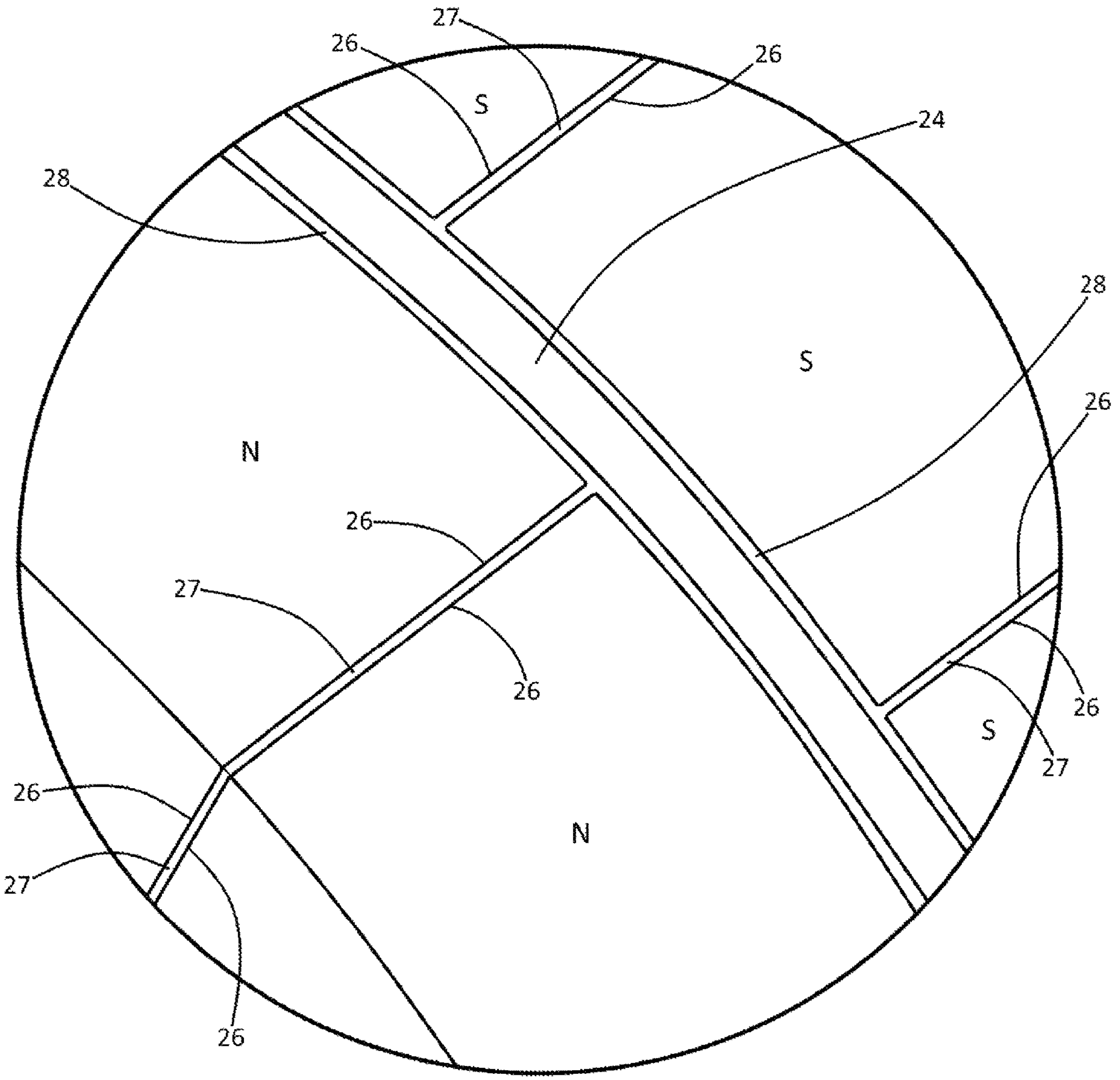
FIG. 2 is a magnified view of a portion of the structure of FIG. 1, as indicated in FIG. 1.
Figure 3:
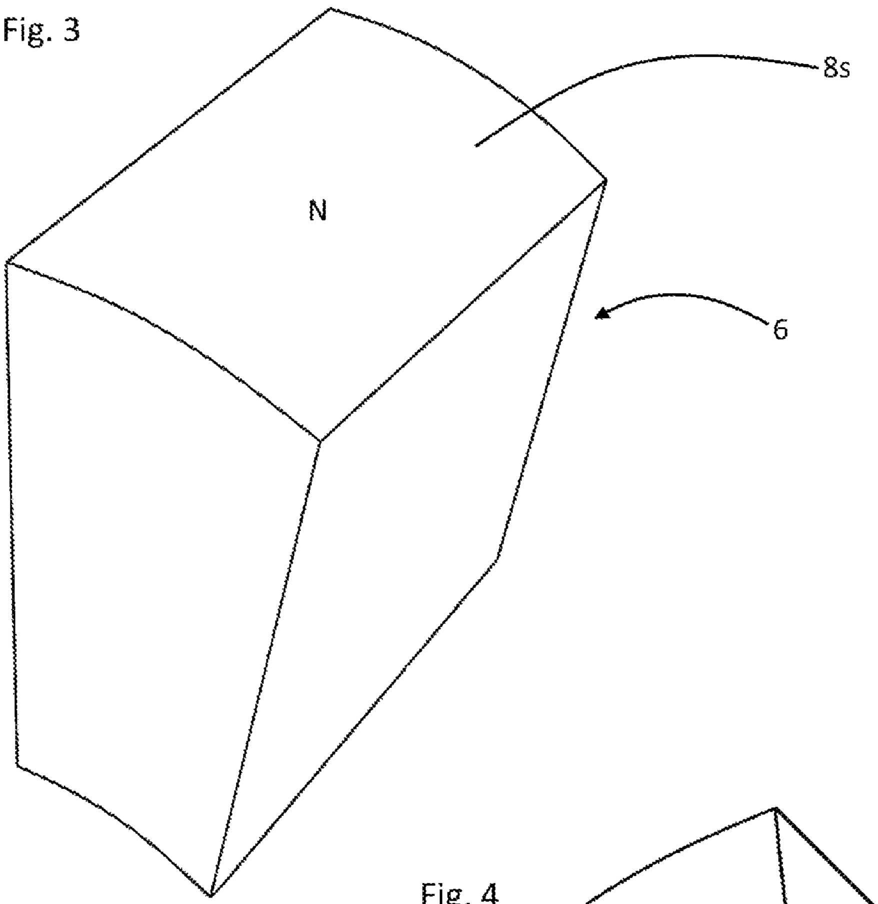
FIG. 3 is a perspective view of a segment of one of the magnetic rings of FIG. 1.
Figure 4:
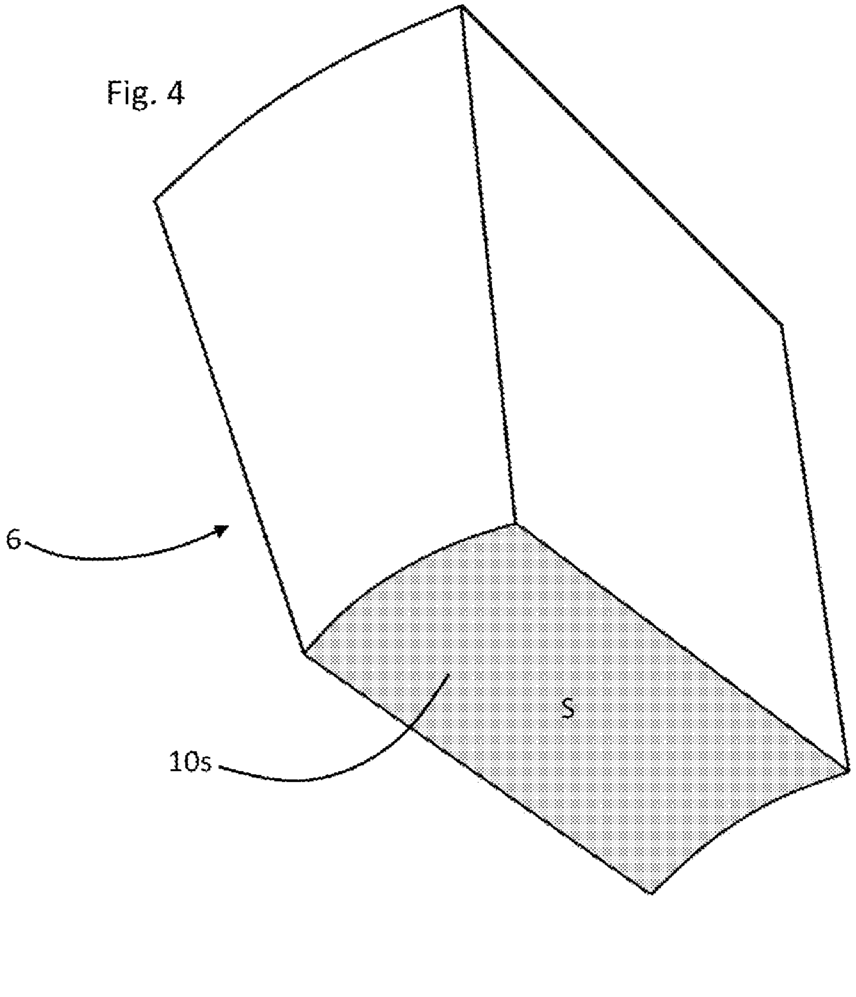
FIG. 4 is an alternative perspective view of the structure depicted in FIG. 3.
Figure 5:
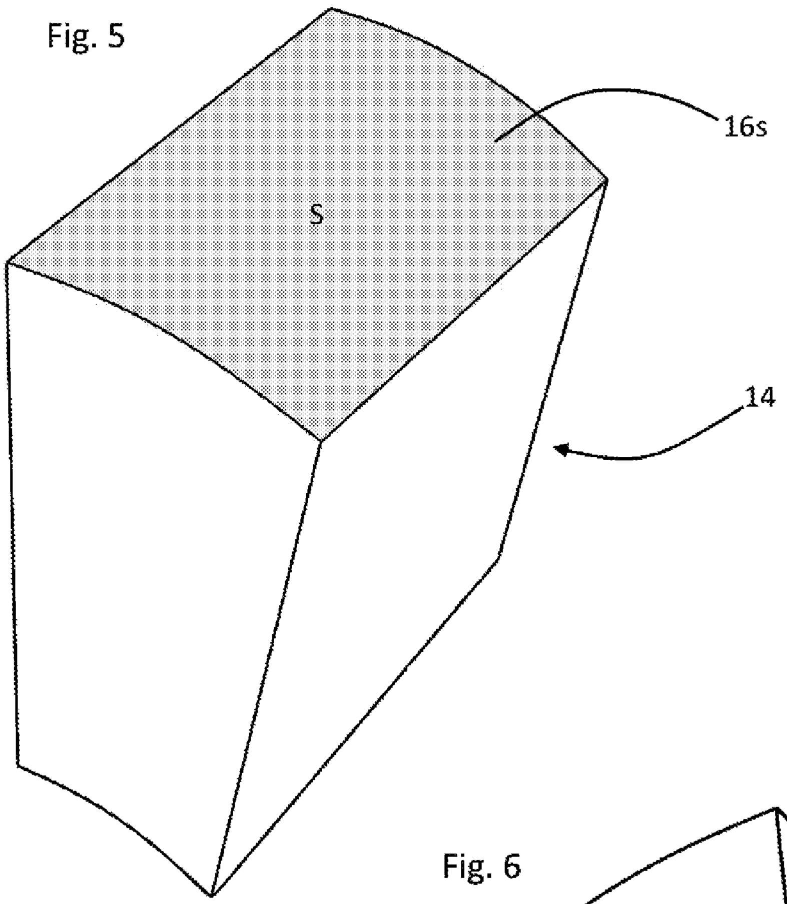
FIG. 5 is a perspective view of a segment of another magnetic ring component of the FIG. 1 structure.
Figure 6:
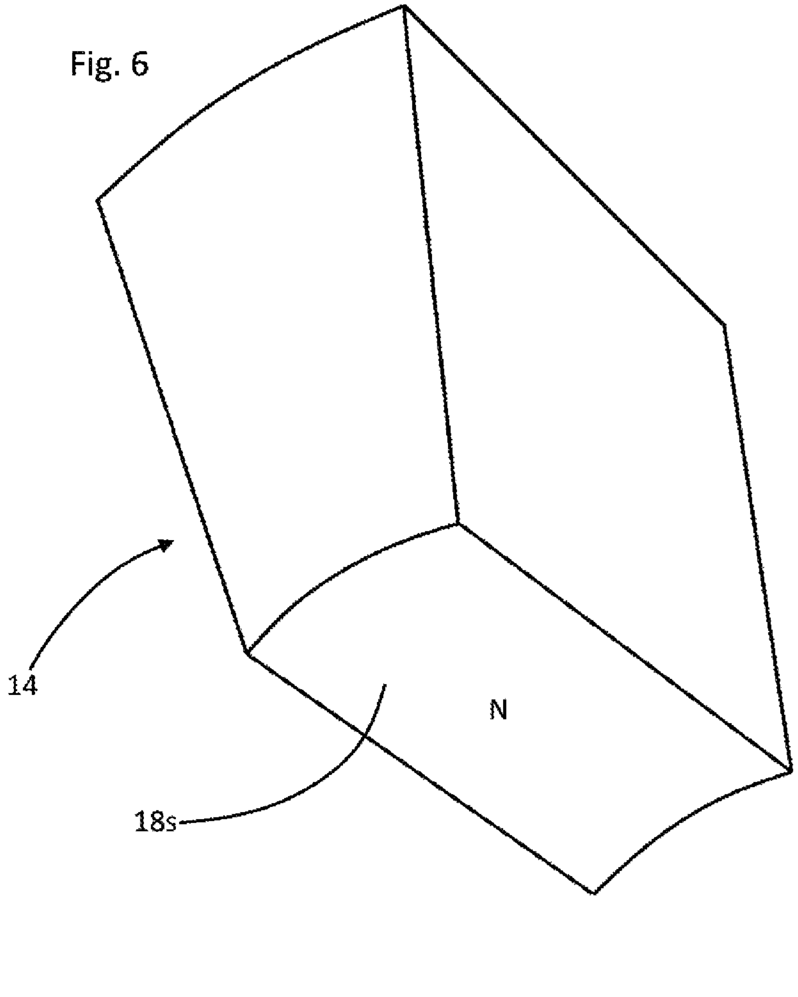
FIG. 6 is an alternative perspective view of the structure of FIG. 5.

Referring simultaneously to FIGS. 1-6, the pluralities of magnetic rings 2 and 4 are preferably segmented by circumferential arrays of radially extending seams 26. Adhesive bonds or bonding matrices of epoxy or cyanoacrylate based adhesive 27 are preferably interposed at such segmenting seams 26 in order to hold the rings' separate magnet segments 6 and 14 in their magnetic ring configurations. As shown in FIG. 3, each segment 6 of the first magnetic rings 2 has an convexly curved north pole outer face 8*s*, and has a concavely curved south pole inner face 10*s*. Conversely, each of the segments 14 of the second rings 4 has a convex south pole outer face 16*s*, and has a concave north pole inner face 18*s*.

Referring to FIGS. 2 and 7, a further structural component of the instant inventive roll 1 comprises a plurality of magnetic armaturing effect resisting spaces between the magnetic rings. If the axial and oppositely axial faces of FIG. 7's rings 2 and 4 were to directly contact each other, magnetic armaturing of those rings' closely adjacent north and south poles would occur, undesirably diminishing the magnetic strength of the roll. To prevent such magnetic armaturing resisting gaps or spaces are interposed between the magnetic rings' axial and oppositely axial faces. Such magnetic armature effect avoiding gaps 25 are preferably established by magnetically transparent or non-magnetic spacer rings 24 which are interposed between the rings 2 and 4. In the preferred embodiment, such spacer rings 24 are composed of aluminum.

Referring to FIGS. 2 and 7, a further structural component of the instant inventive roll 1 comprises a plurality of magnetic armaturing effect resisting gaps 25. If the axial and oppositely axial faces of FIG. 7's rings 2 and 4 were to directly contact each other, magnetic armaturing of those rings' closely adjacent north and south poles would occur, undesirably diminishing the magnetic strength of the roll. To prevent such magnetic armaturing, gaps or spaces 25 are interposed between the magnetic rings' axial and oppositely axial faces. Such magnetic armature effect avoiding gaps 25 are preferably established by magnetically transparent or non-magnetic spacer rings 24 which are interposed between the rings 2 and 4. In the preferred embodiment, such spacer rings 25 are composed of aluminum.

While axial armaturing of magnetic flux at the radially outer ends of the magnetic rings 2 and 4 is desirably avoided to prevent dissipation of the rolls' magnetic strength, magnetic armaturing at the radially inner ends of such magnetic rings is preferably established in order to enhance the roll's magnetic strength. To facilitate radially inner magnetic armaturing, a mild steel or iron sleeve or substrate 29 is preferably provided, such substrate 29 overlying the roll's cylindrical core 31 and immediately underlying the radially inner ends of the magnetic rings 2 and 4.

The magnetic rings 2 and 4 are inherently held in the alternating series of FIG. 1 via the rings' magnetic attraction. However, in the preferred embodiment the roll's rigidity and integrity is further secured by provision of a second plurality of adhesive bonds 28, each such bond securing one of the magnetic rings to one of the spacer rings 24.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A magnetic separating conveyor output roll comprising:

(a) a plurality of radial polarity magnetic rings, each magnetic ring among the plurality of radial polarity magnetic rings having a radially outer north pole having axial and oppositely axial ends;

(b) a plurality of oppositely radial polarity magnetic rings, each magnetic ring among the plurality of oppositely radial polarity magnetic rings having a radially outer south pole having axial and oppositely axial ends, wherein the radial polarity and oppositely radial polarity magnetic rings are stacked in an alternating series along a rotation axis; and (c) a plurality of magnetic strength preserving spacers, each spacer among the plurality of magnetic strength preserving spacers having a radially outer face having axial and oppositely axial ends, wherein the axial end of said each spacer's radially outer face abuts the oppositely axial end of the radially outer north pole of one of the radial polarity magnetic rings, wherein the oppositely axial end of said each spacer's radially outer face abuts the axial end of the radially outer south pole of one of the oppositely radial polarity magnetic rings, said each spacer being non-magnetic at such abutting positions, wherein each magnetic ring's radial cross section is rectangular, and wherein each magnetic ring is segmented by a circumferential array of radially extending seams, and further comprising a first plurality of adhesive bonds, each such bond residing at one of said seams, wherein each seam among the circumferential array of radially extending seams extends from a radially inner end of one of the magnetic rings to said one of the magnetic ring's radially outer end.

2. The magnetic separating conveyor output roll of claim 1 further comprising an armaturing substrate, said substrate radially inwardly underlying the magnetic rings' radially inner ends.

3. The magnetic separating conveyor output roll of claim 2 further comprising a second plurality of adhesive bonds, each such bond joining one of the magnetic rings with one of the spacers.

4. The magnetic separating conveyor output roll of claim 3 wherein each magnetic strength preserving spacer comprises a non-magnetic ring.

5. The magnetic separating conveyor output roll of claim 4 wherein the armaturing substrate is composed of iron or mild steel.

6. The magnetic separating conveyor output roll of claim 5 wherein each magnetic strength preserving spacer is composed of aluminum.

* * * * *